US012503049B2

(12) United States Patent
Anderson et al.

(10) Patent No.: US 12,503,049 B2
(45) Date of Patent: Dec. 23, 2025

(54) REARVIEW ASSEMBLY FOR A VEHICLE HAVING VISIBLY OPAQUE OPTICAL ELEMENT FOR REFLECTING INFRARED LIGHT

(71) Applicant: Gentex Corporation, Zeeland, MI (US)

(72) Inventors: Kasen K. Anderson, Jenison, MI (US); Richard T. Fish, Jr., Hudsonvile, MI (US); Steven J. Veenman, Hudsonville, MI (US); Michael F. Lisowski, Holland, MI (US); Joshua D. Lintz, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/655,690

(22) Filed: May 6, 2024

(65) Prior Publication Data

US 2024/0367587 A1 Nov. 7, 2024

Related U.S. Application Data

(60) Provisional application No. 63/500,406, filed on May 5, 2023.

(51) Int. Cl.
*B60R 1/12* (2006.01)
*B60R 1/29* (2022.01)

(52) U.S. Cl.
CPC .............. *B60R 1/1207* (2013.01); *B60R 1/29* (2022.01); *B60R 2001/1253* (2013.01); *B60R 2300/103* (2013.01)

(58) Field of Classification Search
CPC ...... B60K 2370/176; B60K 2370/1868; B60K 2370/21; B60K 2370/52; B60K 2370/797; B60K 35/00; B60K 2370/152; B60K 2370/1526; B60K 2370/1529; B60K 2370/1531; B60K 2370/1533; B60K 2370/736; B60K 2370/739; B60R 1/00; B60R 2300/70; B60R 2300/80;
(Continued)

(56) References Cited

U.S. PATENT DOCUMENTS 6,572,233 B1 6/2003 Northman et al.
8,237,909 B2 8/2012 Ostreko et al.
(Continued)

FOREIGN PATENT DOCUMENTS

JP 2006007883 A 1/2006

*Primary Examiner* — Nathnael Aynalem
(74) *Attorney, Agent, or Firm* — Price Heneveld LLP; Brian James Brewer

(57) ABSTRACT

A rearview assembly for a vehicle is provided including a reflective element; an infrared illumination source configured to emit infrared light through the reflective element to illuminate a field of view; and an optical element disposed behind the reflective element and configured to direct infrared light from the infrared illumination source towards the field of view. The optical element including: a molded portion comprised of a visibly opaque material that is substantially transparent to the infrared light, the molded portion having a front surface and a rear surface; and a reflector disposed on the rear surface of the molded portion and configured to substantially reflect infrared light emitted from the illumination source that passes through the molded portion towards the field of view.

18 Claims, 12 Drawing Sheets

(58) Field of Classification Search
CPC ............... B60R 2300/802; B60R 11/04; B60R 2001/1215; B60R 11/0235; B60R 2011/0276; B60R 2300/205; B60R 1/22; B60R 1/23; B60R 2300/8046; B60R 2300/20; B60R 2300/202; B60R 2011/0028; B60R 2011/0082; B60R 2011/0092; B60R 2011/0084; B60R 11/02; B60R 1/04; B60R 1/12; B60R 1/1207; B60R 1/29; B60R 2001/1253; B60R 2300/103; H04N 7/181; G02B 27/01; G02B 27/0093; G05B 2219/35503; G06F 3/012
USPC .......................................................... 348/148
See application file for complete search history.

(56) References Cited

U.S. PATENT DOCUMENTS 8,339,526 B2 12/2012 Minikey, Jr. et al.
8,411,245 B2 4/2013 Lee et al.
11,639,134 B1* 5/2023 Huizen ................... B60R 1/088 348/77
2006/0050356 A1* 3/2006 Varaprasad ............ G02F 1/157 359/265
2008/0037267 A1 2/2008 Converse et al.
2009/0040778 A1 2/2009 Takayanagi et al.
2020/0029002 A1* 1/2020 Polak ..................... H04N 23/50
2020/0353868 A1* 11/2020 Schut ........................ B60R 1/04
2021/0323473 A1* 10/2021 Peterson ................. B60R 1/025
2022/0172489 A1* 6/2022 Wieczorek ........... B60N 2/0025
2022/0371513 A1* 11/2022 Peterson .................. B60R 1/12
2023/0137004 A1 5/2023 Huizen et al.
2023/0302994 A1* 9/2023 Miller ....................... B60R 1/12

* cited by examiner

REARVIEW ASSEMBLY FOR A VEHICLE HAVING VISIBLY OPAQUE OPTICAL ELEMENT FOR REFLECTING INFRARED LIGHT

CROSS-REFERENCE TO RELATED APPLICATION

This application claims priority under 35 U.S.C. § 119(e) upon U.S. Provisional Patent Application No. 63/500,406, entitled "REARVIEW ASSEMBLY FOR A VEHICLE HAVING VISIBLY OPAQUE OPTICAL ELEMENT FOR REFLECTING INFRARED LIGHT" filed on May 5, 2023, by Kasen K. Anderson et al., the entire disclosure of which is incorporated herein by reference.

TECHNOLOGICAL FIELD

The present invention concerns rearview assemblies and imaging systems for vehicles and, more particularly, relates to an imaging system for an interior rearview assembly.

SUMMARY OF THE INVENTION

It is one aspect of the present disclosure to provide a rearview assembly for a vehicle. The rearview assembly includes a reflective element; an infrared illumination source disposed behind the reflective element and configured to emit infrared light through the reflective element to illuminate a field of view with infrared light, the field of view including at least part of a vehicle cabin; and an optical element disposed behind the reflective element and configured to direct infrared light from the infrared illumination source towards the field of view. The optical element including: a molded portion comprised of a visibly opaque material that is substantially transparent to the infrared light, the molded portion having a front surface and a rear surface; and a reflector disposed on the rear surface of the molded portion and configured to substantially reflect infrared light emitted from the illumination source that passes through the molded portion towards the field of view.

It is another aspect of the present disclosure to provide an imaging system for a vehicle including a reflective element configured to provide a driver of the vehicle with a view rearward relative to the vehicle, the reflective element substantially transparent in an infrared region of the electromagnetic spectrum; at least one imager in connection with the rearview assembly and configured to acquire an image within a field of view of the imager, the field of view including at least part of a vehicle cabin; an infrared illumination source disposed behind the reflective element and configured to emit infrared light through the reflective element to illuminate at least a portion of the field of view of the imager with infrared light; and an optical element disposed behind the reflective element and configured to direct infrared light from the infrared illumination source towards the field of view. The optical element including: a molded portion comprised of a visibly opaque material that is substantially transparent to the infrared light, the molded portion having a front surface and a rear surface; and a reflector disposed on the rear surface of the molded portion and configured to substantially reflect infrared light emitted from the illumination source that passes through the molded portion towards the field of view.

It is another aspect of the present disclosure to provide a rearview assembly for a vehicle, the rearview assembly includes: a reflective element configured to provide a driver of the vehicle with a view rearward relative to the vehicle, the reflective element substantially transparent in an infrared region of the electromagnetic spectrum; at least one imager in connection with the rearview assembly and configured to acquire an image within a field of view of the imager, the field of view including at least part of a vehicle cabin; a plurality of infrared LEDs disposed behind the reflective element and configured to emit infrared light through the reflective element to illuminate at least a portion of the field of view of the imager with infrared light; and an optical element disposed behind the reflective element and configured to direct infrared light from the infrared LEDs towards the field of view. The optical element including: a molded portion comprised of a visibly opaque material that is substantially transparent to the infrared light, the molded portion having a front surface and a rear surface, and a plurality of recessed cups formed in the front surface each with an opening through to the rear surface where a corresponding one of the plurality of LEDs is positioned; and a reflector disposed on the rear surface of the molded portion and configured to substantially reflect infrared light emitted from the illumination source that passes through the molded portion, the reflector reflects the infrared light towards the field of view of the imager.

These and other features, advantages, and objects of the present device will be further understood and appreciated by those skilled in the art upon studying the following specification, claims, and appended drawings.

BRIEF DESCRIPTION OF THE DRAWINGS

The embodiment(s) will now be described with reference to the following drawings, in which.

The components in the figures are not necessarily to scale, emphasis instead being placed upon illustrating the principles described herein.

DETAILED DESCRIPTION OF EMBODIMENTS

Figure 1:
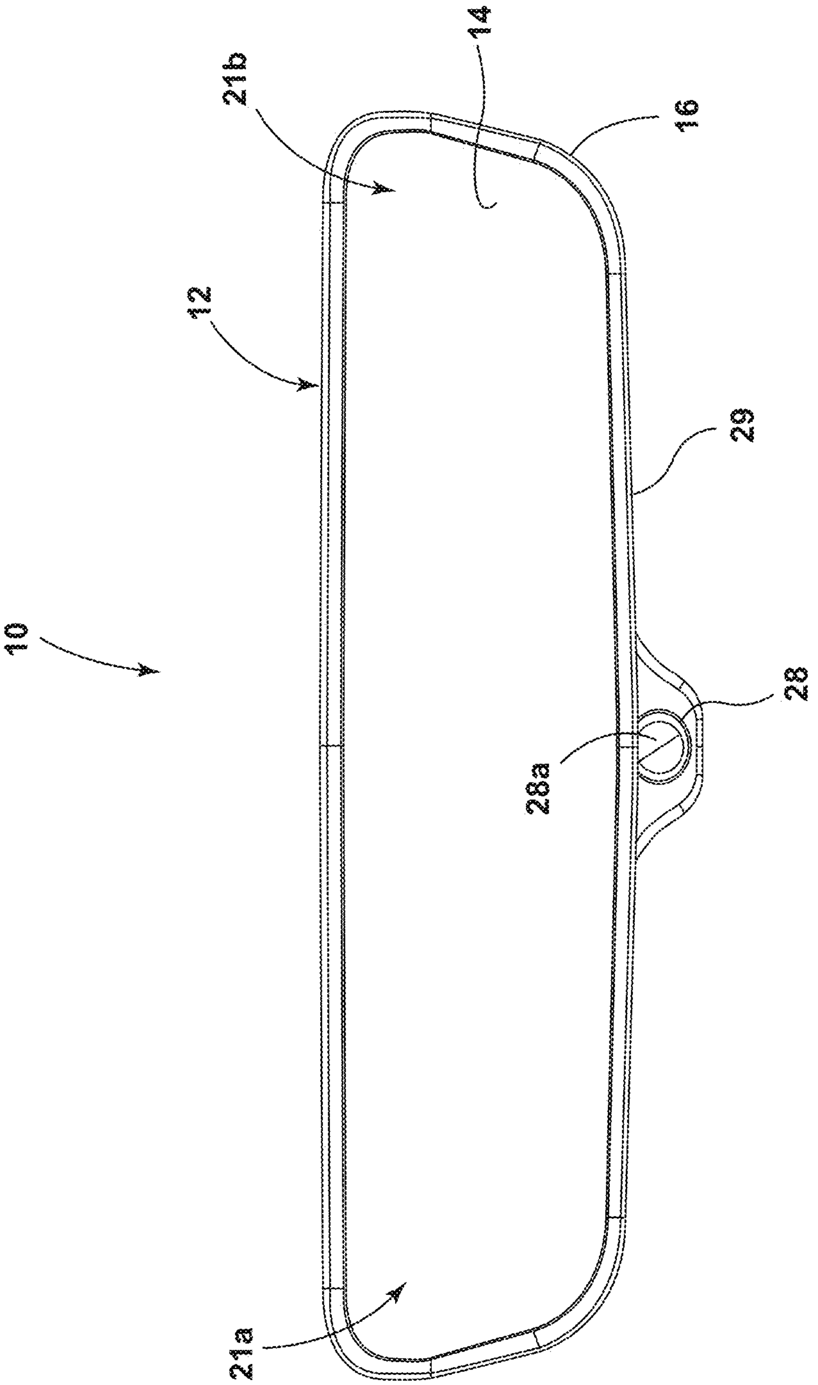
FIG. 1 generally illustrates a front view of an imaging system according to one aspect of the present disclosure.

For purposes of description herein, the terms "upper," "lower," "right," "left," "rear," "front," "vertical," "horizontal," and derivatives thereof shall relate to the rearview assembly as oriented in FIG. 1. Unless stated otherwise, the term "front" shall refer to the surface of the element closer to an intended viewer of the rearview mirror assembly, and the term "rear" shall refer to the surface of the element further from the intended viewer of the rearview mirror assembly. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As defined herein, "approximately" and "about," when used in reference to angles, proportions, and the like, may, in some embodiments, mean within plus or minus ten percent of the stated value. In other embodiments, "approximately" and "about," when used in reference to angles, proportions, and the like, may mean within plus or minus five percent of the stated value. In further embodiments, "approximately" and "about," when used in reference to angles, proportions, and the like, may mean within plus or minus three percent of the stated value. In yet other embodiments, "approximately" and "about," when used with reference to angles, proportions, and the like, may mean within plus or minus one percent of the stated value.

Referring to FIGS. 1-9, reference numeral 10 generally designates an imaging system operable to perform one or more identification functions. An exemplary embodiment of the imaging system 10 is shown incorporated into an interior rearview mirror assembly 12 of an automotive vehicle. The interior rearview mirror assembly 12 may be configured as an electro-optic rearview mirror assembly 12 with a reflective element 14 with a variable reflectance disposed in a housing 16. The reflective element 14 is substantially transparent in the near infrared and the infrared regions of the electromagnetic spectrum. As used herein, "infrared" or "IR" shall mean any light having a wavelength between about 800 nm and 1000 nm. Though illustrated as incorporated in the mirror assembly 12, it may be understood that one or more components of the imaging system 10 may be incorporated in other portions of the vehicle (e.g., panels, an overhead console, visor, center consoles, a steering wheel 17 (FIGS. 6-9), etc.).

Figure 2:
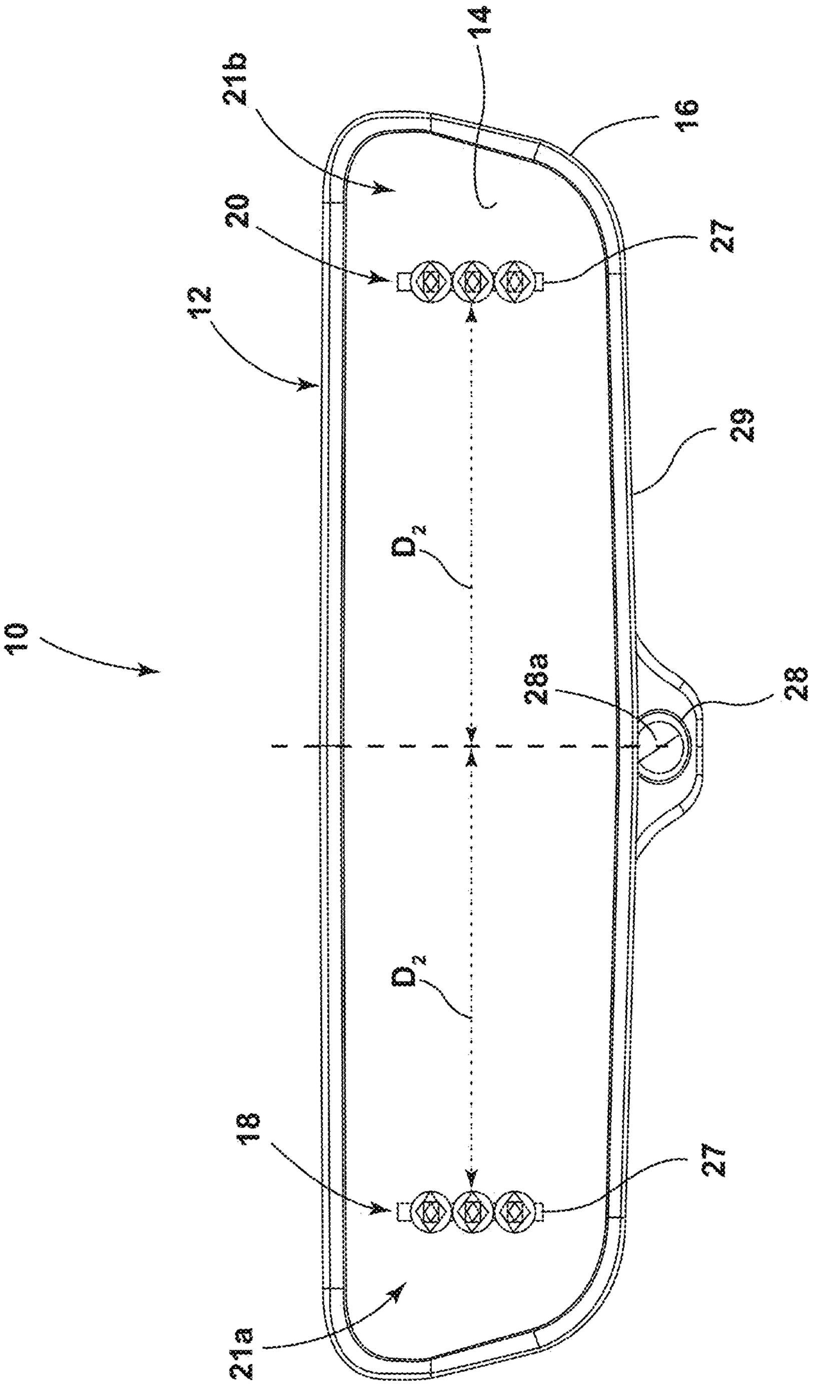
FIG. 2 generally illustrates a front view of an imaging system having light sources incorporated with a rearview assembly according to one aspect of the present disclosure.
Figure 3:
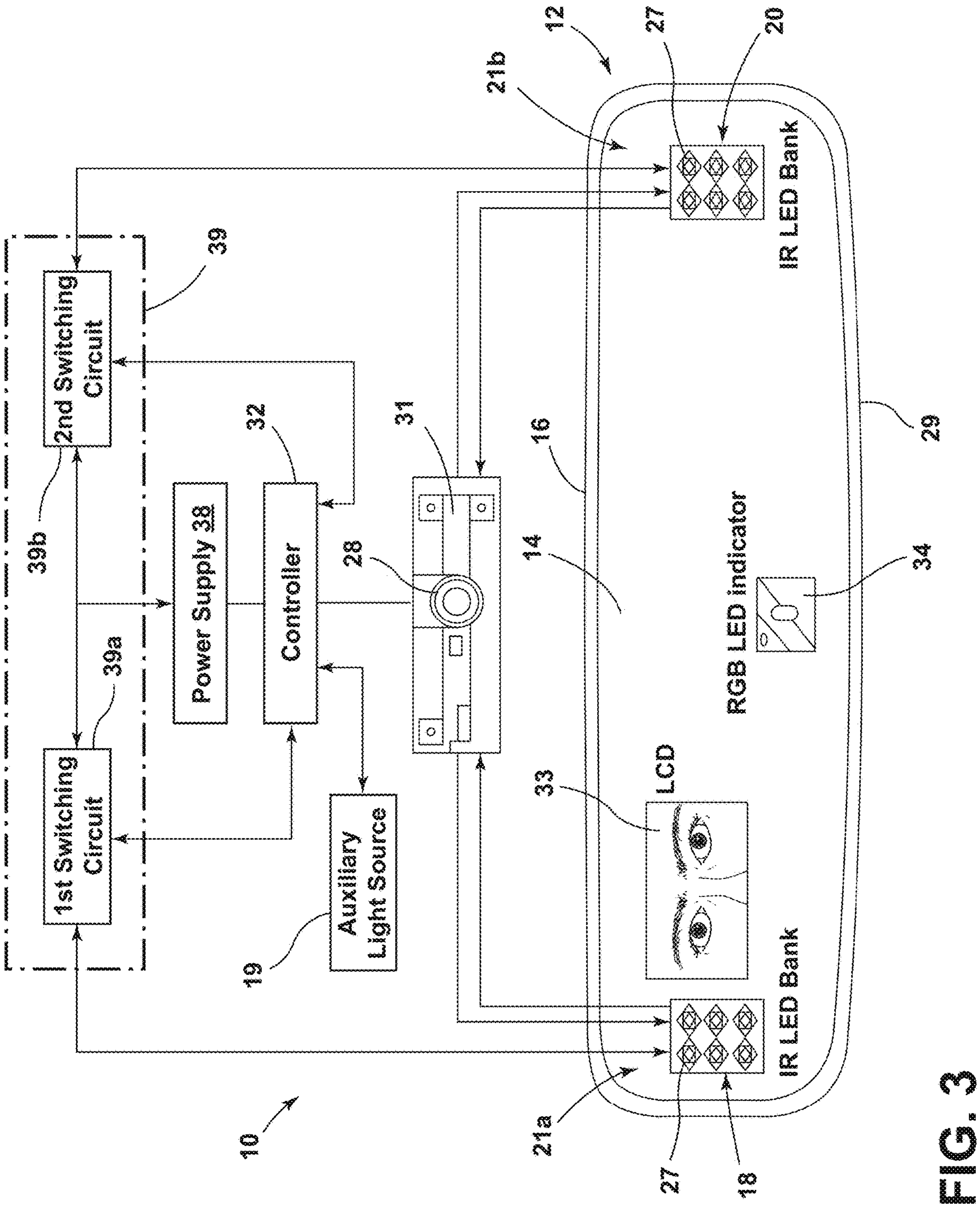
FIG. 3 generally illustrates a schematic view of an imaging system according to one aspect of the present disclosure.
Figure 4:
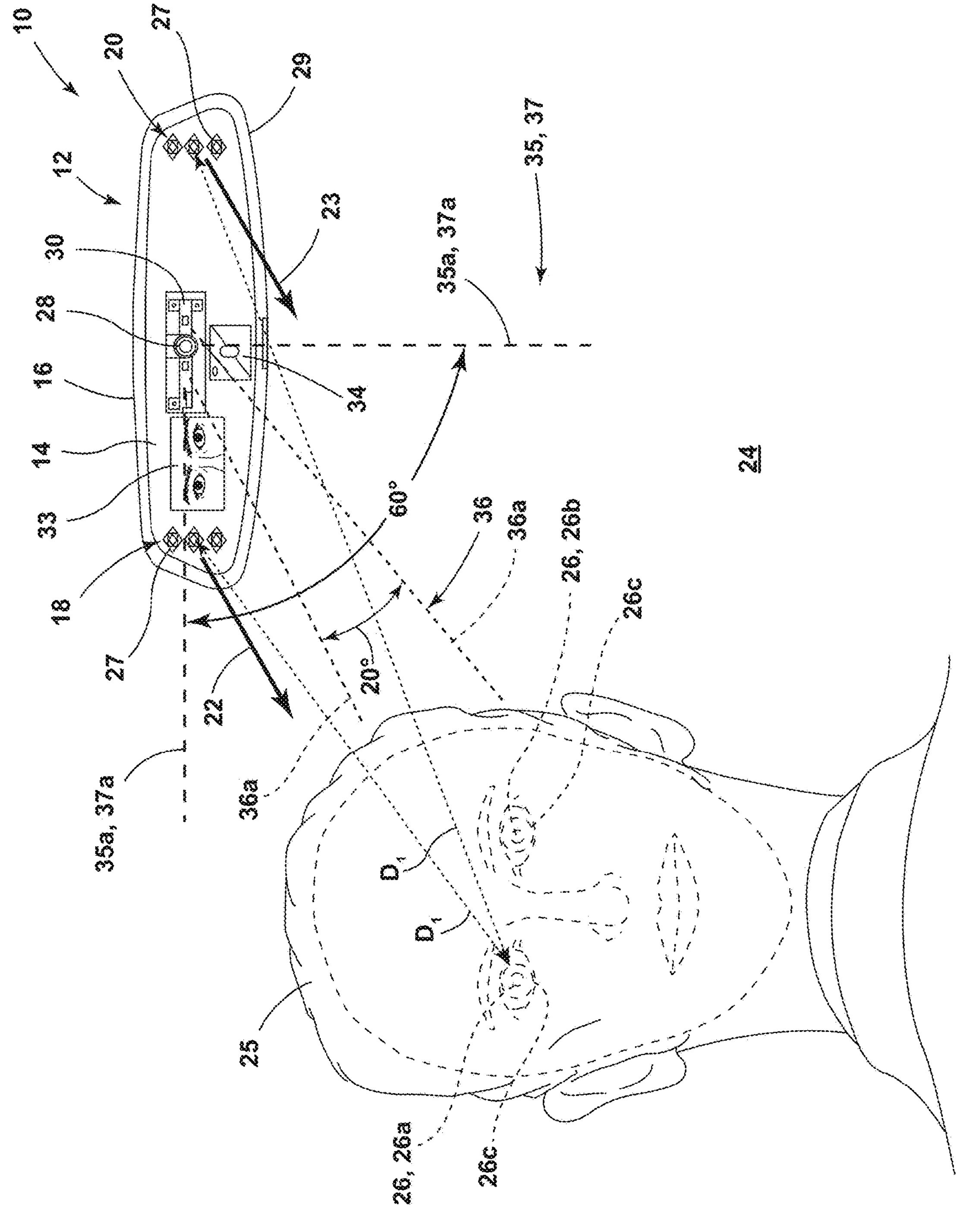
FIG. 4 generally illustrates a perspective view of an imaging system incorporated in an interior rearview mirror assembly according to one aspect of the present disclosure.

As shown in FIGS. 2-4, a first light source 18 and a second light source 20 may be disposed inside the housing 16 concealed behind the mirror element 14 while still providing illumination in a field of view of the imaging system 10. As discussed further herein, one or more auxiliary light sources 19 (FIG. 3), or third light sources, may also be provided in interior structures of the vehicle (e.g., a center console, vehicle seats, a dashboard, etc.), and/or adjacent an outer panel, or wall, of the vehicle, such as a roof or a side wall. The auxiliary light source 19 may be an after-market accessory or incorporated as an integrated assembly of the vehicle. While the first light source 18 is shown located at a first side 21*a* of the mirror assembly 12 and the second light source 20 is shown at a second side 21*b*, opposite the first side 21*a*, it is to be understood that their illustrated positions should not be construed as limiting.

Figure 5:
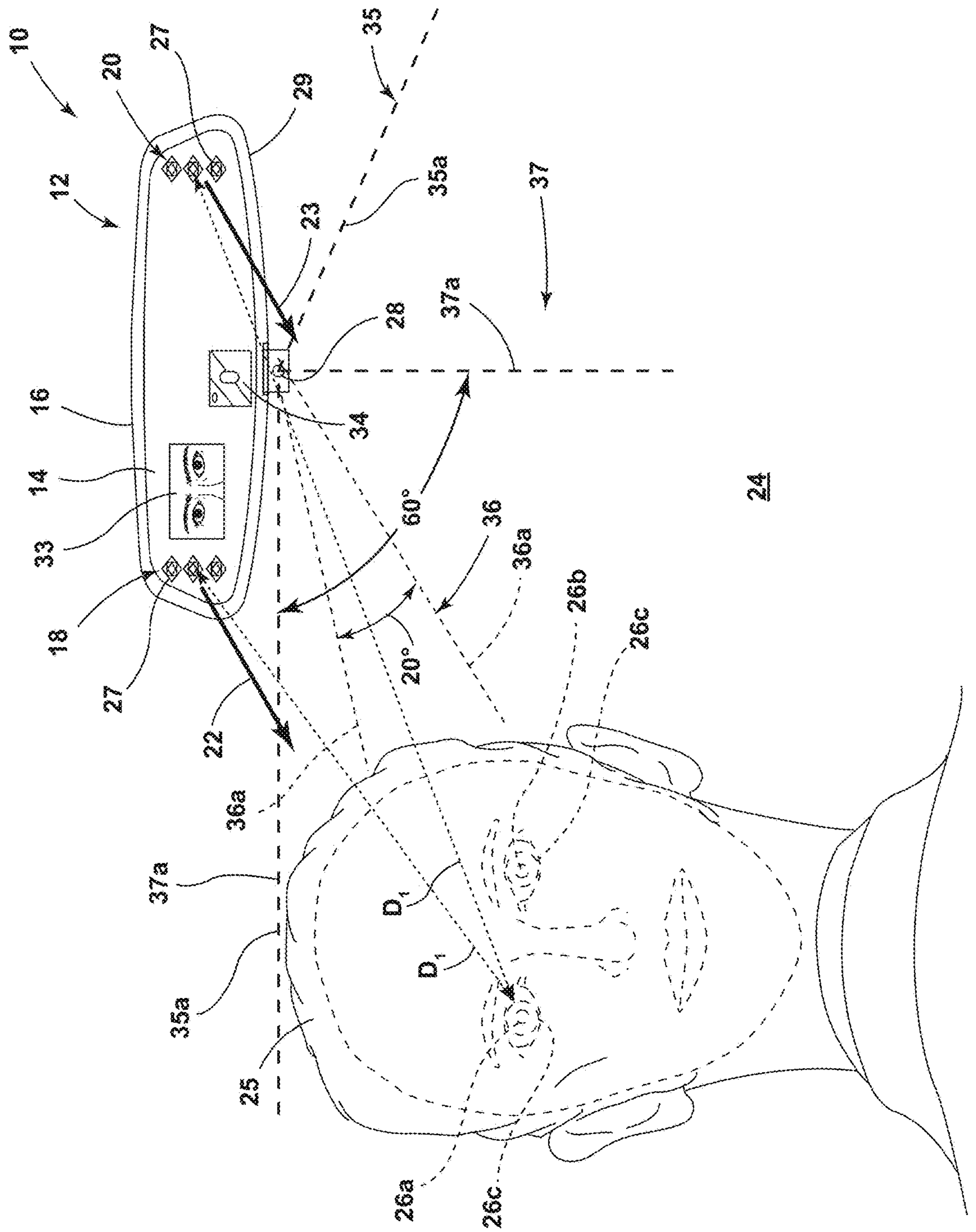
FIG. 5 generally illustrates a perspective view of an imaging system incorporated in an interior rearview mirror assembly according to one aspect of the present disclosure.
Figure 8:
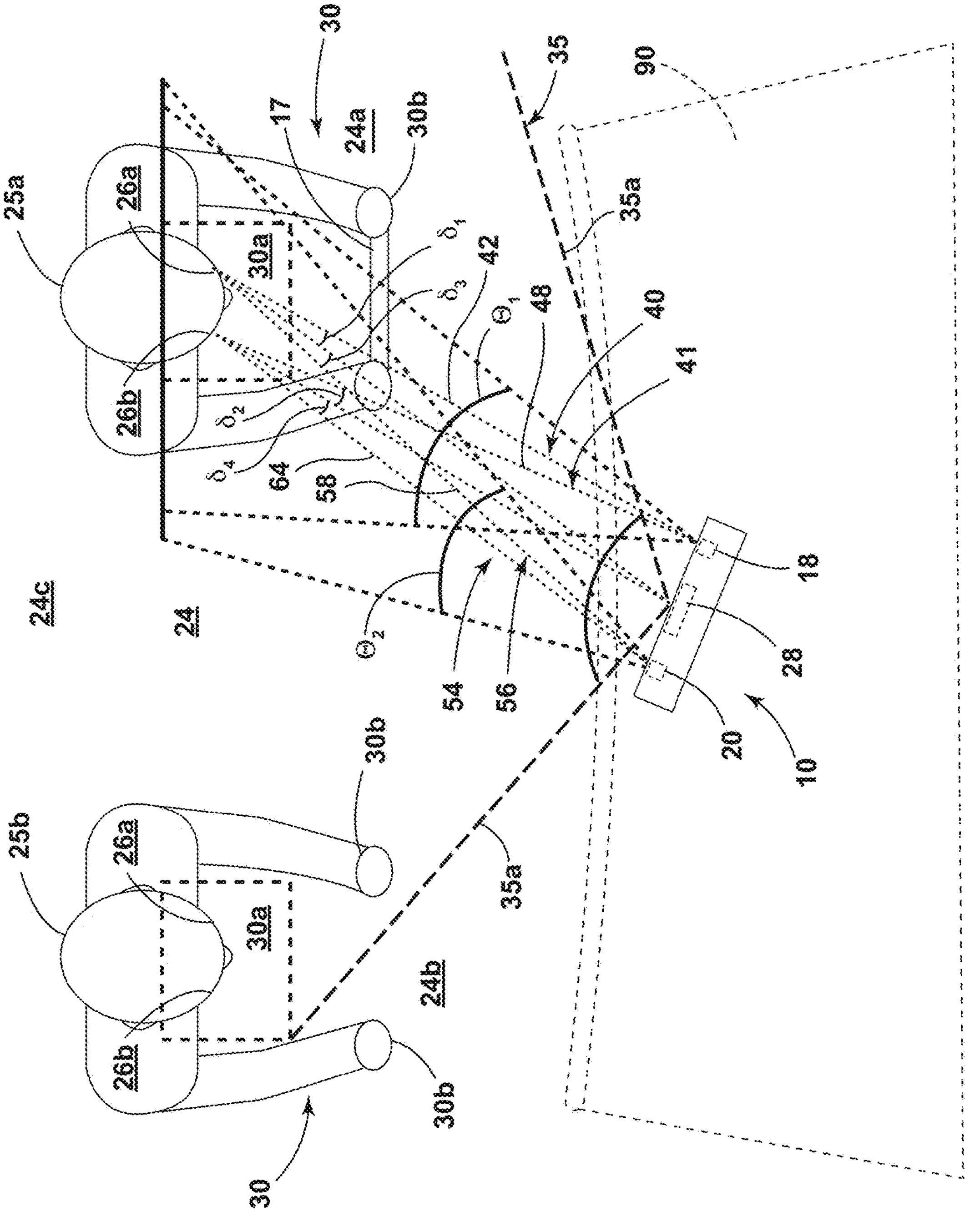
FIG. 8 generally illustrates a top view of an imaging system incorporated in an interior rearview mirror assembly according to one aspect of the present disclosure.
Figure 9:
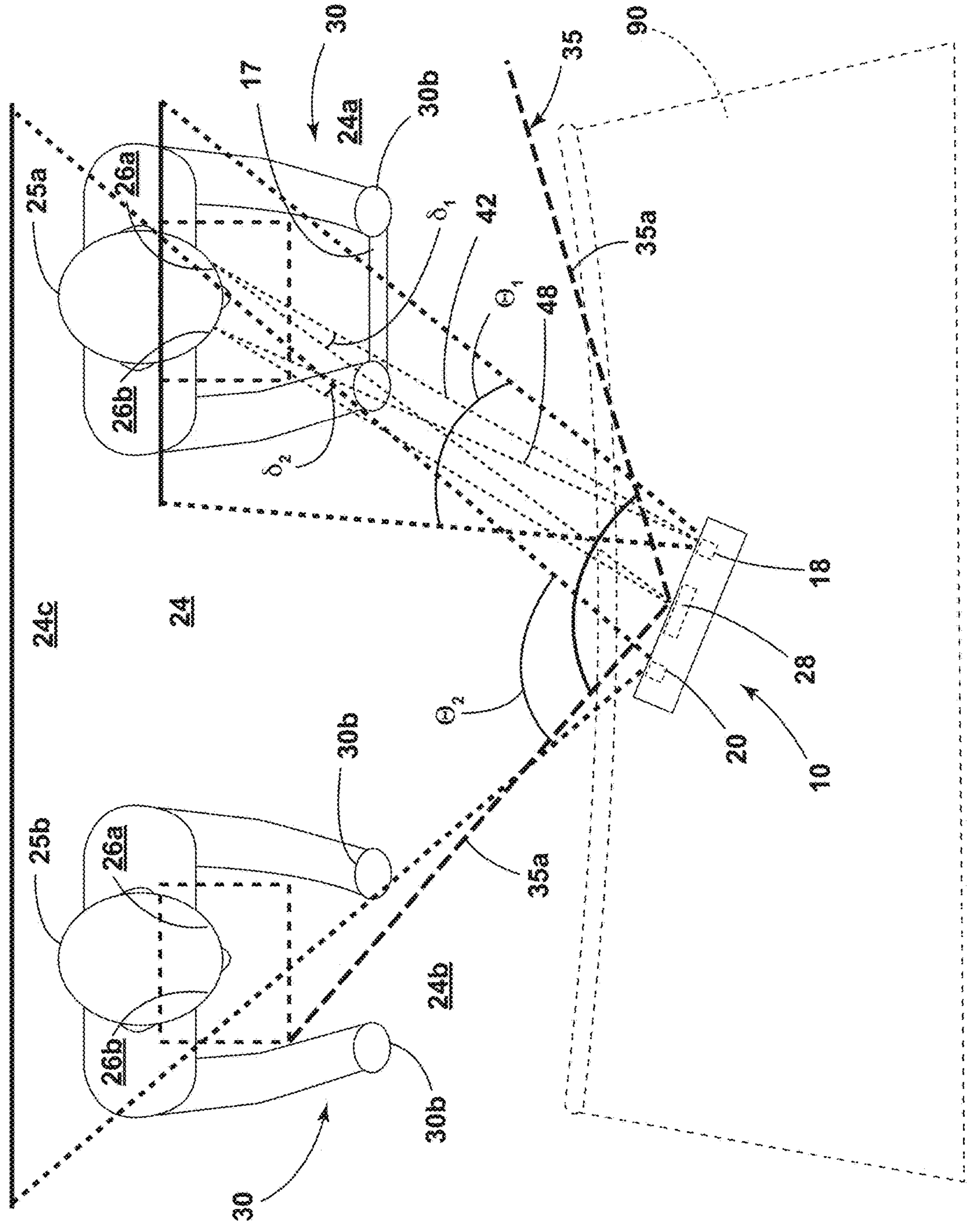
FIG. 9 generally illustrates a top view of an imaging system incorporated in an interior rearview mirror assembly according to one aspect of the present disclosure.

As shown in FIGS. 4 and 5, the first light source 18 is configured to project a first illumination generally represented by arrow 22, and the second light source 20 is configured to project a second illumination generally represented by arrow 23. The first and second illuminations 22, 23 may be projected through the mirror element 14 into a cabin 24 of the vehicle and onto an occupant 25, such as a driver 25*a*, a front passenger 25*b* (FIGS. 8-9), or rear passengers. The cabin 24 may include front passenger compartments 24*a*, 24*b*, such as a driver compartment 24*a* and a front passenger compartment 24*b* (FIGS. 8 and 9). Additionally, a rear passenger compartment 24*c* (shown in FIGS. 8 and 9) may correspond to a seating location of the rear passengers. The first light source 18 may be spaced by a first distance $D_1$ from a target surface. In some implementations, the target surface may correspond to an eye 26 of the occupant 25. In some implementations, the target surface may correspond to a first target surface 26*a* and a second target surface 26*b*, the first and second target surfaces 26*a*, 26*b* associated with a first eye 26*a* and a second eye 26*b*, respectively, of the occupant 25. In some implementations, the target surface may correspond to an iris 26*c* of the occupant 25. In general, the first and second illuminations 22, 23 may illuminate one or more features of the occupant 25 to facilitate monitoring or authentication functions.

The first and second illuminations 22, 23 have the same wavelength, including wavelengths ranging from 800 nm to 1000 nm.

As depicted, the first and second light sources 18, 20 may each include one or more infrared emitter banks 27 that emit the first and second illuminations 22, 23, respectively. Each illumination source (emitter bank) 27 may include a plurality of near IR light-emitting diodes (LEDs) 102 (FIG. 10) or near IR VCSELs, which may be grouped in an array or matrix, or otherwise grouped in other arrangements.

A problem with providing sufficient illumination from the infrared emitter banks 27 to the field of view of the imaging system 10 is that conventional reflectors made of aluminum or the like, may be visible through the reflective element 14 during daylight conditions. This is because any visible light that can transmit through the reflective element 14 may be reflected back through the reflective element 14 to the eyes of the viewer by such a reflector for the infrared emitter banks 27. The embodiments described below solve this problem.

Figure 11:
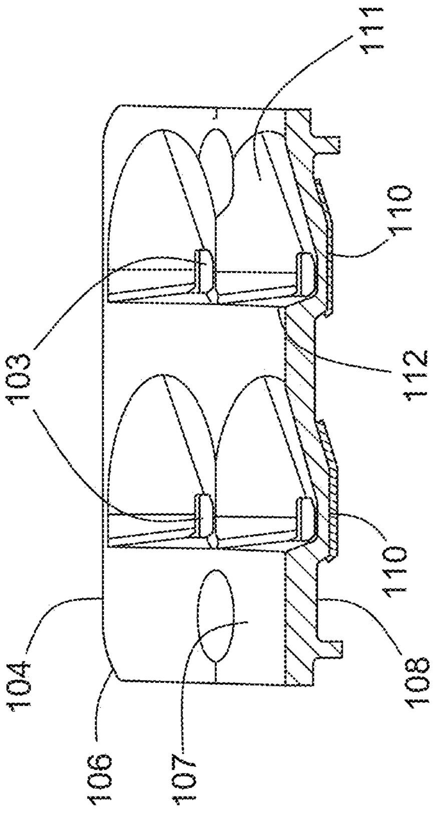
FIG. 11 generally illustrates a cross-sectional perspective view of the LED bank shown in FIG. 10 taken along line XI-XI.
Figure 12:
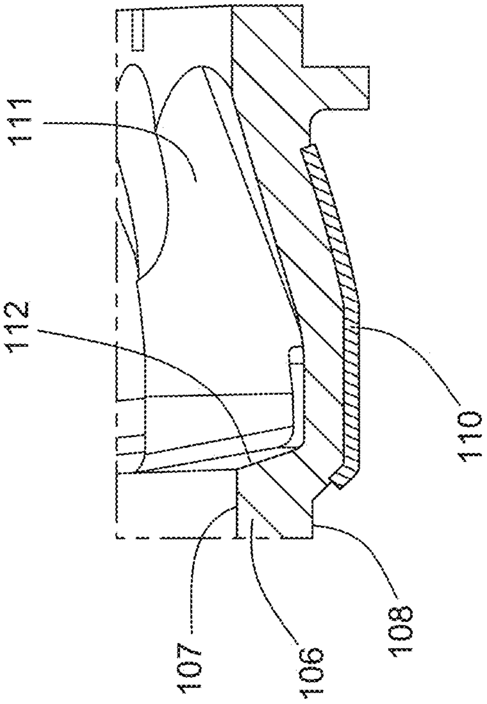
FIG. 12 generally illustrates an enlarged portion of the cross-section of FIG. 11.
Figure 10:
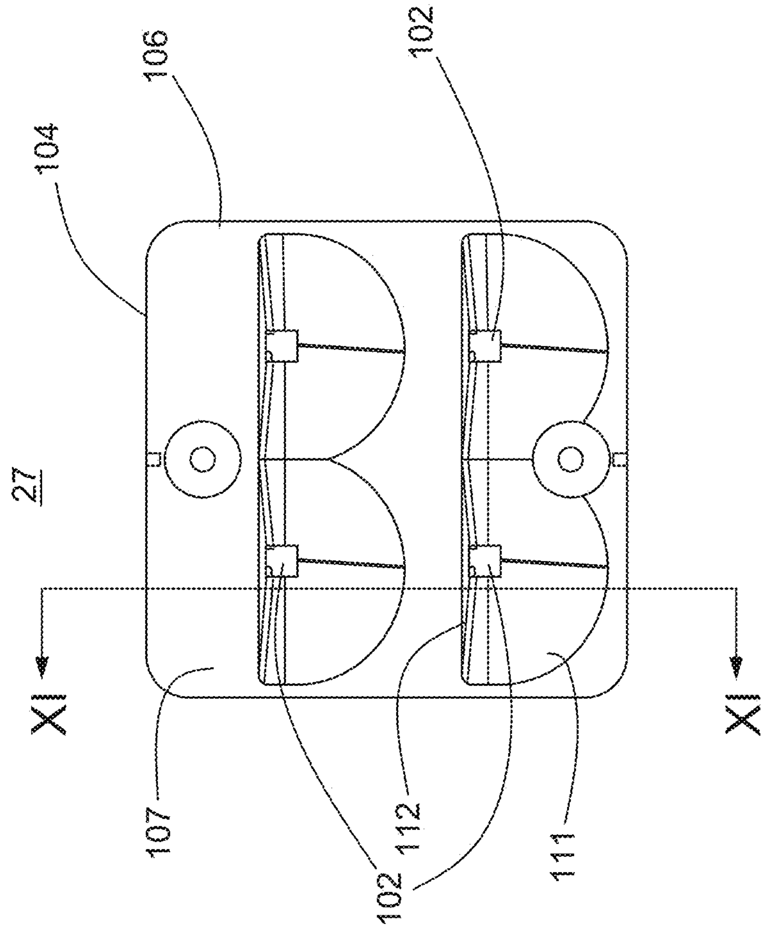
FIG. 10 generally illustrates a front view of an LED bank that may be used in any of the above imaging systems.

A first example of the infrared emitter bank 27 is shown in FIGS. 10-12. The infrared emitter bank 27 includes at least one infrared illumination source (such as LEDs 102)

disposed behind the reflective element 14 and configured to emit infrared light through the reflective element 14 to illuminate a field of view with infrared light, the field of view including at least part of the vehicle cabin 24 and including all or at least a portion of the field of view of the imaging system as discussed further below. The infrared emitter bank 27 further includes an optical element 104 disposed behind the reflective element 14 and configured to direct infrared light from the infrared illumination source 102 towards the field of view. The optical element 104 includes a molded portion 106 having a visibly opaque material that is substantially transparent (a transmittance of at least 80%) in the infrared region. The molded portion 106 includes a front surface 107 and a rear surface 108. The optical element 104 further includes a reflector 110 disposed on the rear surface 108 of the molded portion 106 and configured to substantially reflect infrared light emitted from the infrared illumination source 102 that passes through the molded portion towards the field of view. The molded portion 106 may have a transmittance of at least 80% for infrared light and a transmittance of 5% or less for visible light. In this way, any visible light that passes through the reflective element 14 and reaches the optical element 104 cannot be transmitted through the molded portion 106 to the reflector 110. The optical element 104 is thus not visible to a vehicle occupant even in daylight conditions. On the other hand, the optical element 104 is still effective to reflect the infrared light to the field of view because the infrared light can pass through molded portion 106 and be reflected by the reflector 110 back through the molded portion 106 towards the field of view.

Figure 13:
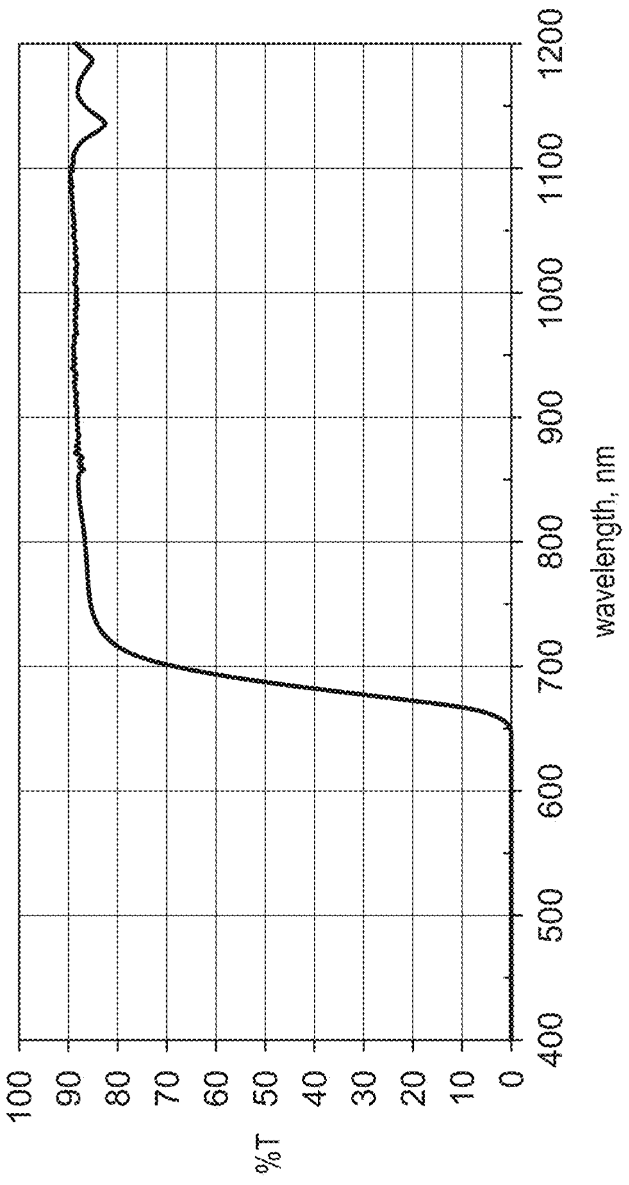
FIG. 13 is a graph showing the transmittance of a molded portion of the LED bank versus wavelength.

The molded portion 106 may be made of any material that is sufficiently opaque to visible light and transmissive to infrared light. As but one example, the molded portion 106 may be made of polycarbonate incorporating an opaque dye such as Epolight™ 7778, 7276A, 7276B, and 7276F visible opaque dyes available from Epolin of Newark, New Jersey. The transmittance of the molded portion 106 when made of polycarbonate incorporating Epolight™ 7778 visible opaque dye is shown in FIG. 13. This particular molded portion 106 blocks light from 200-650 nm, and has a transmittance value of 5% at 661 nm, 50% at 687 nm, 80% at 717 nm, and 85% at 744 nm. Such a molded portion 106 may thus have a matte black color.

The reflector 110 may be formed of a layer of aluminum applied to the rear surface 108 of the molded portion 106. The layer of aluminum may be applied via a sputtered deposition, as a painted coating, or as a machined aluminum adhered to the rear surface 108.

FIG. 11 generally illustrates a cross-sectional perspective view of the LED bank 27 shown in FIG. 10 taken along line XI-XI and FIG. 12 generally illustrates an enlarged portion of the cross-section of FIG. 11. As shown in FIGS. 10-12, the front surface 107 may have truncated recessed cups 111 surrounding openings 103 in which the LEDs 102 are located. The recessed cups 111 are truncated where a relative flat surface 112 serves to prevent infrared light from projecting onto the headliner of the vehicle. Otherwise, if infrared light were projected on the headliner, the light could saturate the image captured by the imaging system 10.

The front surface 107 and the rear surface 108 may have different shapes. This may be to account for refraction of the infrared light when passing through the molded portion 106. The shapes of the front surface 107 and the rear surface 108 may be selected to provide uniform illumination throughout the field of view while taking account angles of refraction and reflection caused by the optical element 104.

Figure 14:
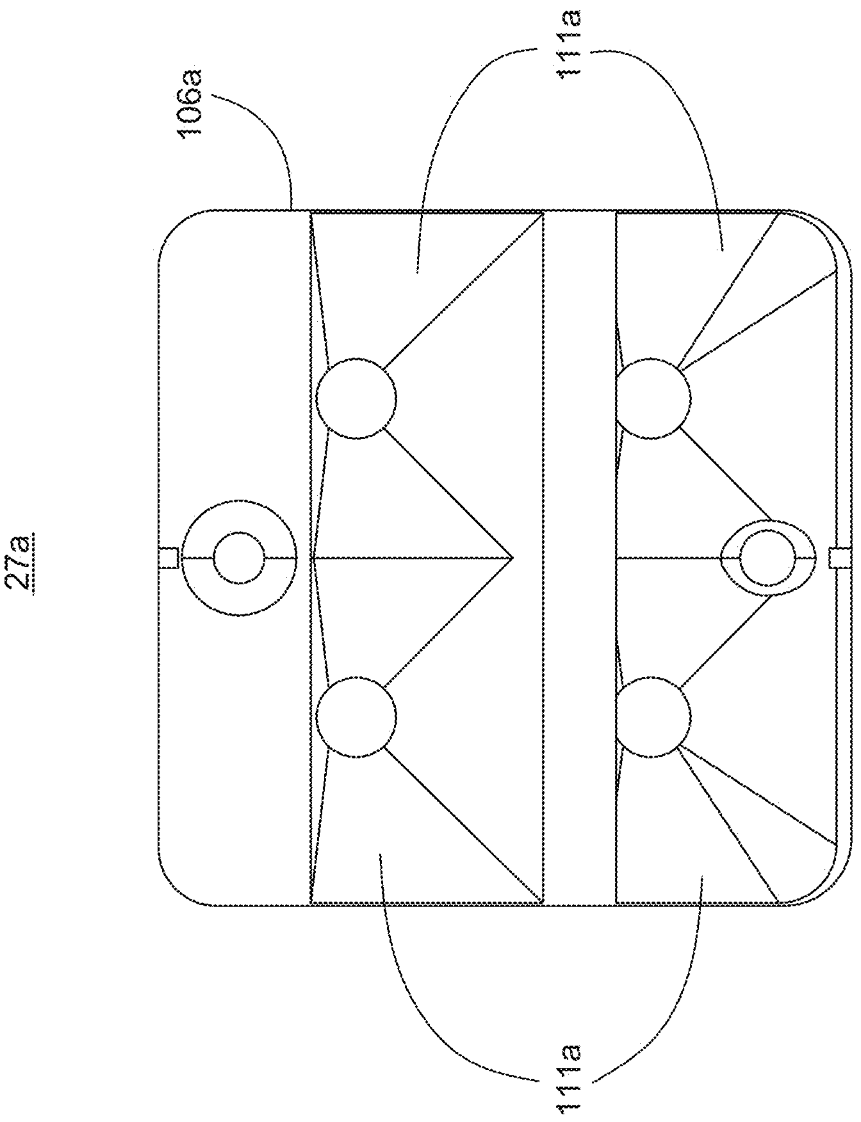
FIG. 14 generally illustrates a front view of another version of an LED bank that may be used in any of the above imaging systems.

FIG. 14 generally illustrates a front view of another version of an LED bank **27*a* wherein the truncated cups 111*a* of molded portion 106*a* are more squared than that of the more rounded cups 111 as shown in FIG. 10**.

The following description of the remaining components of imaging system 10 are taken from U.S. patent application Ser. No. 18/109,395, entitled "IMAGING SYSTEM FOR A VEHICLE," filed on Feb. 14, 2023, and provided to complete the description of the imaging system 10. The entire disclosure of U.S. patent application Ser. No. 18/109,395 is incorporated herein by reference.

An imager 28 may be disposed on an exterior surface of the housing 16 and include a lens **28*a* for receiving light. As shown in FIGS. 1, 2, and 5, the imager 28 may be centrally disposed on a bottom surface of the housing 16. In this configuration, the imager 28 may be considered "chin-mounted" when extending from an outer edge 29 of the housing 16 (e.g., underneath the mirror element 14). As shown in FIG. 4, the imager 28 may be disposed inside the housing 16 and may be located in a generally central location behind the mirror element 14. In general, the imager 28 may be configured to capture reflected light representative of a biometric feature of the driver 25*a* and generate image data corresponding to the one or more acquired images. The imager 28 may also be configured to acquire one or more images of the cabin 24 of the vehicle, including images of the front passenger compartments 24*a*, 24*b* and/or images of the rear passenger compartment 24*c***.

As shown in FIG. 2, each of the light sources 18, 20 may be spaced from the imager 28 by a second distance $D_2$. The second distance $D_2$ may correspond to a lateral spacing between the imager 28 and each of the light sources 18, 20. More specifically, the second distance $D_2$ may be measured in a horizontal direction extending laterally across the mirror element along a horizontal field component **35*a*, which is further discussed in reference to FIGS. 4-9. By laterally spacing one or both of the light sources 18, 20 from the imager 28, the first and/or second illuminations 22, 23 may be configured to reflect off of the eye 26 at an angle that allows eye-tracking and identification functions to be performed by the system 10. Although this example shows the light sources 18 and 20 spaced equal distance from the imager 28, the distances may be different and both light sources 18, 20 may be located on the same side of the imager 28**.

The imager 28 may be configured to capture images of lower seating portions (e.g., proximate to a seat deck). In this way, the field of view 35 of the imager 28 may capture the lower body portion 30 of the occupants 25, such as laps **30*a*, hands 30*b* (e.g., driver's hands 30*b* on the steering wheel 17), torsos 30*c*, etc., as shown in FIGS. 6-9. By capturing image data in the field of view 35 including the lower seating portions, the imager 28 may be configured to detect, for example, whether a mobile device (e.g., smartphone) is placed on or around the driver's lap 30*a***.

The imager 28 may be configured to capture images of occupants over a wide range of heights, for example from 1300 mm to 2200 mm, from 1500 mm to 2000 mm, 1600 mm to 1900 mm, etc. The position of the imager 28 may also limit the effect of distortion along edges of the lens **28*a* of the imager 28. According to some aspects of the present disclosure, the imager 28 is operable to capture a width of the cabin 24. Stated differently, a width of the field of view 35 of the imager 28 may exceed a distance between the front passenger 25*b* and the driver 25*a* along the width of the cabin 24. By capturing a wide field of view encompassing a front portion of the cabin 24 (e.g., back portions of driver and passenger seats), the inherent distortion at the edges of the lens 28***a* may occur beyond the front passenger 25*b* and the driver 25*a* (e.g., proximate to front side doors of the vehicle). This may limit poor image quality adjacent portions of the occupants 25, such as the face; eyes 26*a*, 26*b*; torsos 30*c*; and laps 30*a* of the occupants 25.

Referring now to FIG. 3, the imager 28 may be in electrical communication with a printed circuit board (PCB) 31 and in communication with a controller 32. The controller 32 may include one or more processors configured to process image data received from the imager 28 to monitor/identify the driver 25*a*, the front passenger 25*b*, and/or the rear passenger. In operation, the controller 32 and/or a processor of the imager 28 may be operable to process image data corresponding to an image of the occupant 25 to identify one or more body parts of the occupant 25 via a first algorithm. For example, the controller 32 may execute the first algorithm to identify the lap 30*a*, hands 30*b*, torso 30*c*, shoulders, neck, and/or face of the occupant 25. The first algorithm may be trained and/or programmed with images of various forms of each body part in different positions.

Additionally, the controller 32 may be configured to execute a second algorithm operable to determine a pose of the occupant 25. The controller 32 may be configured to associate the pose with a distracted state of the occupant 25. For example, the controller 32 may execute the second algorithm to classify the occupant's neck arching downwardly and/or the occupant's head tilted forwardly as a "looking down" pose. The controller 32 may associate the looking down pose with a distracted state of the occupant 25 based on historical data, pre-programming, and/or iterative training. Additionally, or alternatively, the controller 32 may execute the second algorithm to classify one or both hands 30*b* of the occupant 25 on the lap 30*a* of the occupant 25 with a "hands-off-of-wheel" pose. The controller 32 may associate the hands-off-of-wheel pose with the distracted state of the occupant 25.

The controller 32 may also be operable to execute a third algorithm configured to track motion of one or more body parts of the occupant 25. For example, by employing one of the first and second algorithms in parallel with the third algorithm, the controller 32 may determine the distracted state based on finger movement of one or both hands 30*b* of the occupant 25 by associating finger movement with mobile device interaction (e.g., typing/texting). The controller 32 may also be operable to detect a mobile device based on light projected from or reflected off of the mobile device via a fourth algorithm. For example, the controller 32 may execute the fourth algorithm to analyze image data generated based on infrared light or visible light to identify pixel data of the image data that corresponds to higher luminosity. It is generally contemplated that the controller 32 may be operable to combine one or more of the algorithms to detect the distracted state.

The controller 32 may be operable to detect and/or categorize any number of distracted states based on a projected level of distraction of the occupant 25. For example, the controller 32 may determine a first distracted state in response to a combination of factors identified by the algorithms or detection routines of the controller 32. For example, the controller 32 may detect a first distracted state in response to a combination of the occupant 25 looking down or a hands-off-of-wheel pose in combination with a moving or typing motion on the mobile device. In such cases, the field of view 35 may provide for image data depicting the mobile device in the lap 30*a* or lower seating portion as previously described. In some cases, the controller 32 may determine a second distracted state corresponding to the hands-off-of-wheel pose. The controller 32 may be configured to then categorize the first distracted state with a first level of distraction and categorize the second distracted state with a second level of distraction. In the above example, the controller 32 may determine that the first level of distraction is greater than the second level of distraction. The controller 32 may then generate a response signal based on the level of distraction of the occupant 25. The response signal may be operable to control various functions (e.g., the function depending on the level of distraction) in the cabin 24 to alert the occupant 25 of a distracted state.

In some implementations, the controller 32 may be configured to detect an eye glint of the occupant 25 and/or a pupil of the occupant 25 to determine focal direction data corresponding to a focal direction of the eye 26. The controller 32 may then incorporate the focal direction data into any one of the first, second, third, or fourth algorithms to determine one or more distracted states. The eye glint may be identified as the brightest specular reflection of visible or infrared light from an outer surface of a cornea of the eye 26 of the occupant 25. The eye glint may occur at a position of the outer surface of the cornea that overlaps the iris 26*c* and may be identified by its contrast to surrounding portions of the image. By tracking the focal direction of the occupant 25, the controller 32 may be configured to detect a direction in which the occupant 25 is looking and may identify or infer a level of distraction based on this information, alone or in combination with other factors. The imager 28 may be operated by the controller 32 to adjust an exposure time (e.g., lessen the exposure time) when one or both light sources 18, 20 are operating for the detection of eye glint.

By way of example, the controller 32 may incorporate eye-tracking functions to determine whether the driver 25*a* is looking toward the mobile device and/or away from the front of the vehicle. For example, the controller 32 may be operable to receive image data corresponding to an image of the lower body portion 30 and determine a first condition corresponding to the presence of the mobile device on or near the lower body portion 30. Further, the controller 32 may be operable to determine a second condition corresponding to a focal direction of the eye 26 and determine, based on the first condition and the second condition, the distraction level corresponding to the occupant 25 viewing the mobile device. The second condition may also, or may alternatively, be detected in response to the controller 32 determining the presence of the mobile device based on the image data. For example, the controller 32 may determine that the occupant 25 is looking at and/or interacting with the mobile device.

As shown in FIG. 3, the controller 32 may communicate with a display 33 disposed inside the housing 16 of the interior rearview mirror assembly 12 and visible through the mirror element 14. The controller 32 may be configured to operate the display 33 to show image data received from the imager 28. The display 33 may be configured as an LCD, LED, OLED, plasma, DLP, or other display type. Examples of displays that may be utilized are disclosed in U.S. Pat. No. 6,572,233, entitled "Rearview Mirror With Display," U.S. Pat. No. 8,237,909, entitled "Vehicular Rearview Mirror Assembly Including Integrated Backlighting for a Liquid Crystal Display (LCD)," U.S. Pat. No. 8,411,245, entitled "Multi-Display Mirror System and Method for Expanded View Around a Vehicle," and U.S. Pat. No. 8,339,526, entitled "Vehicle Rearview Mirror Assembly Including a High Intensity Display," all of which are incorporated herein by referenced in their entirety.

In some implementations, the controller 32 may also be operable to access biometric data and/or driving metric data associated with the driver 25*a*. The controller 32 may be configured to communicate an instruction to output the biometric data and/or driving data to the display 33 depending on an operating state or gear status (e.g., park, drive, reverse, etc.) of the vehicle. The controller 32 may communicate with a powertrain system controller to determine the operating state of the vehicle. For example, the controller 32 may determine the vehicle is in park and communicate the instruction to the display 33 to indicate the biometric and/or driving metric data. The biometric data may include a duration of the blink of the eyes 26*a*, 26*b*, a dilation of the pupils, a body pose of the driver 25*a*, and/or any other biometric feature that may be used to determine a health status of the driver 25*a*.

The controller 32 may also be configured to receive vehicle operation data corresponding to speed, acceleration, deceleration, brake force, proximity to other vehicles, etc., and generate the driving metric data based on the vehicle operation data. The vehicle operation data may be communicated to the controller 32 from the powertrain system controller or another on-board vehicle controller that tracks driving operations. The driving metric data may be communicated to the driver 25*a* via the display 33 in the form of a numerical score (e.g., 8/10), descriptive verbiage (e.g., "Very Good"), or the like.

With continued reference to FIG. 3, the first light source 18 and the second light source 20 may be in electrical communication with the PCB 31 and in communication with the controller 32. The controller 32 may be located on the PCB 31, elsewhere located in the housing 16, or elsewhere located in the vehicle. The controller 32 may further be in communication with various devices incorporated in the interior rearview mirror assembly 12 and/or equipment of the vehicle. The controller 32 may include one or more processors configured to selectively activate the first and second light sources 18, 20. The third light source 19 disposed within the cabin 24 (e.g., an overhead light disposed in a roof of the vehicle, a light disposed in a side panel of the vehicle, etc.) may be employed to illuminate at least a portion of the cabin 24 to supplement light provided by one or both of the first and second light sources 18, 20. The third light source 19 may also be in electrical communication with the controller 32, such that the controller 32 may operate the third light source 19 based on an amount of light detected in the cabin 24.

In some cases, the controller 32 may provide visual notifications indicating an operating state of the imaging system 10. The notifications may be communicated via the display 33 or an indicator 34 configured to output a visual notification indicating an operating state of the imaging system 10. The indicator 34 may be configured as an LED or other light source and is operable by the controller 32 to flash and/or change colors to indicate the operating state of the imaging system 10. In one specific embodiment, the indicator 34 may be configured as an RGB LED operable to indicate the operating state by emitting light expressed in a red color, a green color, a blue color, or any color combination thereof. The controller 32 may be operable to communicate an instruction to control the indicator 34 to indicate a warning condition. In this way, the imaging system 10 may be configured to alert the driver 25*a* when the controller 32 detects the one or more distracted states.

In order to accurately identify the features of the occupant 25 (e.g., occupant pose, gaze direction, body movements, etc.), the imaging system 10 may adjust an operation based on ambient lighting conditions of the vehicle. For example, the controller 32 may adjust various imaging parameters (e.g., an auto gain threshold) to determine characteristics (e.g., wavelength, intensity, etc.) of the first and/or the second illumination 22, 23. In embodiments where the interior rearview mirror assembly 12 is configured as an electro-optic rearview mirror assembly 12, the controller 32 may additionally, or alternatively, use available feedback mechanisms from a dimming controller to determine the characteristics of the first and/or the second illumination 22, 23. In these embodiments, the transmissive properties of an electro-optic element in the mirror assembly 12 may be configured to filter the first or the second wavelengths corresponding to the first and second illuminations 22, 23. For example, the electro-optic element may be activated to filter out visible light projected from the first light source 18 while allowing infrared light generated by the second light source 20 to pass through the electro-optic element, or vice versa. Additionally, or alternatively, a first electro-optic element overlaying the first light source 18 may be electrically isolated from a second electro-optic element overlaying the second light source 20. In this way, the first electro-optic element may be activated to filter light projected from the first light source 18 while light projected from the second light source 20 remains unfiltered by the second electro-optic element.

Further to adequate lighting conditions of the vehicle, the imaging system 10 may be configured to include manual entry criteria that may improve occupant detection algorithms in the controller 32. For example, eye color and/or skin color may aid the controller 32 in determining the characteristics (e.g., intensity, frequency, etc.) of the first and/or the second illumination 22, 23. The criteria may be entered using any available user-input device of the vehicle or a mobile device in communication with the controller 32. By employing one or more of the foregoing features, the imaging system 10 may benefit from improved speed and accuracy with respect to biometric capture and/or user authentication.

To operate the first light source 18 independently from the second light source 20, power signals supplied to the first light source 18 may have different properties than power signals supplied to the second light source 20. For example, with continued reference to FIG. 3, a single power supply 38 may be employed in electrical communication with the first and second light sources 18, 20. Switching circuitry 39 may interpose one or both of the first and second light sources 18, 20 for stepping down a voltage, or otherwise modifying electrical properties of a signal provided to one or both of the first and second light sources 18, 20. For example, a first switching circuit 39*a* may provide high-voltage (or high-current) pulses to the light source associated with eye glint and/or facial detection, and a second switching circuit 39*b* may provide a continuous current supply to the light source associated with cabin monitoring. As illustrated, the controller 32 may be in electrical communication with the switching circuitry 39 for controlling the first and second switching circuits 39*a*, 39*b*. Alternatively, two individual power supplies may be provided, with a first power supply in communication with the first light source 18 and a second power supply in communication with the second light source 20.

Referring now to FIGS. 4-8, the controller 32 may operate the imager 28 with a field of view 35 that captures both a face of the driver 25*a* and the cabin 24 more broadly. In this way, events occurring in the cabin 24 may be tracked simultaneously with facial features, which may allow the imaging system 10 to better determine whether the driver 25*a* is distracted and identify the cause of the distraction. The field of view 35 may allow the imager 28 to capture images of identifying features of the cabin occupants 25. The field of view 35 may encompass a full width of the vehicle (e.g., from a driver door to a front passenger door). The field of view 35 may allow the imager 28 to capture image data corresponding to images of occupant devices/body parts (e.g., arms and legs, clothing, and wearable or non-wearable devices). The field of view 35 may allow the imager 28 to capture images of vehicle features (e.g., vehicle seats, a center console, the steering wheel 17, a dashboard, seatbelts, side windows of the vehicle, a rear window of the vehicle, etc.). The field of view 35 may allow the imager 28 to capture images of objects outside of the vehicle (e.g., objects viewable via the side and rear windows).

The field of view 35 may have a horizontal field component 35*a* in the range of approximately 120° to 160° and a similar or different vertical field component 35*b*. The horizontal field component 35*a* may be in the range of about 135° to 150°. The horizontal and vertical field components 35*a*, 35*b* may approximate a width and a height of the field of view 35, respectively, for a given depth (e.g., a distance from the imager 28 in a direction normal to the center of the lens 28*a*). For example, at a depth of about 500 mm, the field of view 35 may encompass the width of the cabin 24 and the height of the cabin 24. The depth at which the field of view 35 encompasses the width and/or height of the cabin 24 may be less than 500 mm (e.g., 300 mm) or greater than 500 mm (e.g., 600 mm). Stated differently, the angle of the horizontal field component 35*a* may allow the imager 28 to be operable to capture the full width of the cabin 24 at the first distance $D_1$ from the imager 28 (e.g., a depth of the field of view 35 of approximately 500 mm). For use strictly as a driver monitoring system (DMS), the field of view 35 may be a narrower range such as spanning about 60 degrees.

The field of view 35 may have a generally arcuate shape (e.g., elliptical) or a squared-off shape (e.g., rectangular). The range of the field of view 35 may be dependent on optical properties of the lens 28*a* of the imager 28. Stated differently, the size and quality of the lens 28*a* may determine how expansive the field of view 35 is. By way of example, a field of view 35 having a horizontal field component 35*a* of 120° and a vertical field component 35*b* of 120° may have a regular polygonal or circular shape. If the field of view 35 has a horizontal field component 35*a* of 120° and a vertical field component 35*b* of 90°, then the field of view 35 may have an irregular polygonal or elliptical shape.

Referring more particularly to FIGS. 4 and 5, the field of view 35 may include a first portion 36 and a second portion 37. The first and second portions 36, 37 may provide for image data that focuses on different areas of interest in the cabin 24. In this way, areas of interest representative of the level of distraction of the occupant 25 may be better captured (e.g., higher levels of detail and/or resolution in particular regions of the field of view 35). The field of view portions 36, 37 may be different sizes and/or shapes, and may or may not overlap one another. The second portion 37 may be larger than the first portion 36 and operable to encompass the width and/or height of the cabin 24, and the first portion 36 may be operable to encompass an area corresponding to the face of the driver 25*a*. Alternatively, the first portion 36 and the second portion 37 may each encompass a focal region corresponding to the face of the driver 25*a*.

The first portion 36 includes a first horizontal field component 36*a* and a first vertical field component (not numbered). The second portion 37 includes a second horizontal field component 37*a* and a second vertical field component (not numbered). The shape of the first portion 36, as defined by its field components (e.g., the first horizontal field component 36*a* and the first vertical field component), may or may not be proportional to the second portion 37, as defined by its field components (e.g., the second horizontal field component 37*a* and the second vertical field component).

Still referring to FIGS. 4 and 5, the first portion 36 may be directed to a focal region common to an illuminated region encompassed by a first illumination range Θ1 of the first illumination 22. The first light source 18 may be operable to direct the first illumination 22 toward an area corresponding to a face of the driver 25*a* to illuminate the face of the driver 25*a*. The first light source 18 may be operable to produce high-intensity light within the first illumination range Θ1 of, for example, about 20° (e.g., horizontally and/or vertically) in order to illuminate the face of the driver 25*a*. The remaining range of the first illumination 22 may be distributed to an area surrounding the face, such as the lower body portion 30. The potential distribution of the first illumination 22 is described later in particular reference to FIGS. 6-9.

The second portion 37 may be directed to the same region as the first portion 36 or may be optionally directed to a focal region common to an illuminated region encompassed by a second illumination range Θ2 of the second illumination 23. The second light source 20 may be operable to direct the second illumination 23 toward an area corresponding to the cabin 24 of the vehicle to illuminate driver and passenger compartments 24*a*, 24*b*, 24*c* of the vehicle. The second light source 20 may be configured to produce high-intensity light within the second illumination range Θ2 of, for example, about 120° (e.g., horizontally and/or vertically) in order to illuminate the cabin 24 of the vehicle. The remaining range of the second illumination 23 may be distributed to peripheral areas (e.g., walls, side windows, etc.) of the vehicle. The potential distribution of the second illumination 23 is described later in particular reference to FIGS. 6-9.

Figure 6:
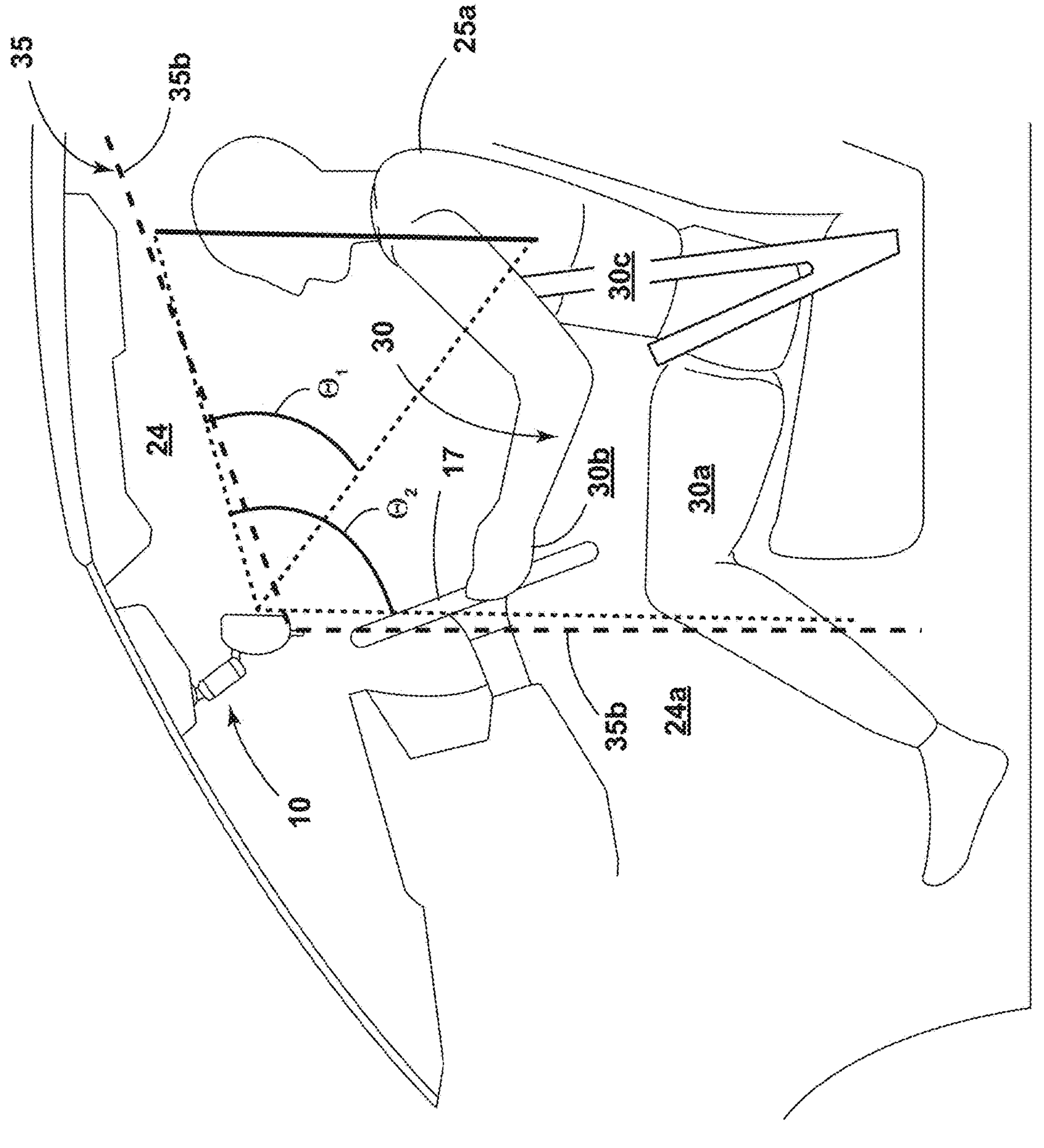
FIG. 6 generally illustrates a side view of an imaging system incorporated in an interior rearview mirror assembly according to one aspect of the present disclosure.
Figure 7:
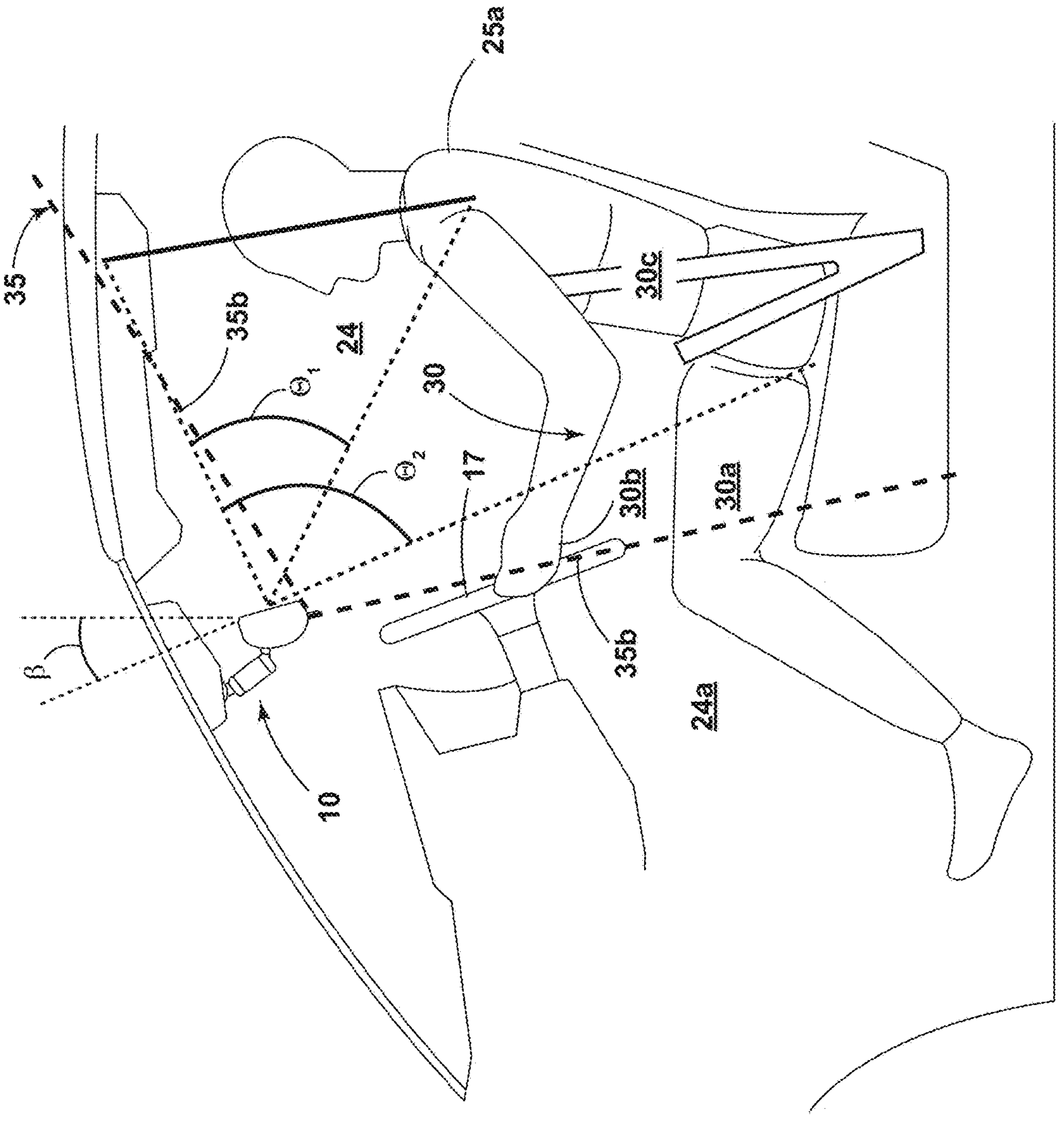
FIG. 7 generally illustrates a side view of an imaging system incorporated in an interior rearview mirror assembly according to one aspect of the present disclosure.

Referring to FIGS. 6 and 7, the field of view 35 of the imager 28 may be in the range of about 120° to 160°. More particularly, the field of view 35 may be in the range of about 140° to 160° to capture undistorted image data of outer portions (e.g., side doors) of the cabin 24 that is typically distorted (e.g., curved or bowed) due to optical aberration. Having an expansive field of view (e.g., in the range of about 120° to) 160° may allow for detection of the occupants 25, drowsiness of the occupants 25, distraction of the occupants 25, a source of distraction, etc. Furthermore, the field of view 35 may allow the capture of images of occupant leg-room compartments. For example, the vertical field component 35*b* may be configured to capture the lower body portion 30 of the occupant 25. With reference to FIGS. 6 and 7 more particularly, the imaging system 10 may leverage a mounting angle β to capture images of varying ranges of the cabin 24. The mounting angle β of the mirror assembly 12 may be manually adjusted to attain an image of the driver's eyes 26.

The first portion 36 of the field of view 35 may be employed for identification and/or authentication functions. For example, the controller 32 may operate the imager 28 with the first portion 36 to enable image acquisition of an iris 26*c* of one or both eyes 26 of the driver 25*a*. The controller 32 may process image data generated by the imager 28 while operating with the field of view 35 to identify the driver 25*a*.

According to some aspects of the disclosure, the horizontal field component 36*a* may be approximately 20° and the first vertical field component (not numbered) may be similar or different. As previously illustrated in FIGS. 3-5, image data generated by the imager 28 may be shown on the display 33. Using the display 33 as a reference, the driver 25*a* may adjust the position of the interior rearview mirror assembly 12 (e.g., the mounting angle β) such that the image appearing on the display 33 is properly trained on the necessary biometric feature (e.g., iris 26*c*) required to identify the driver 25*a*. Driver identification may be used alongside vehicle security features to authorize financial transactions.

For example, changing gears or igniting an engine of the vehicle may be prevented based on a determination that the occupant 25 is not an authorized driver 25*a* of the vehicle. The controller 32 may determine whether the driver 25*a* is authorized by processing the image data to identify the driver 25*a* according to biometric features. To capture the biometric features of the occupant 25, the controller 32 may employ a second identification function, or a driver monitoring function that includes facial recognition that may activate the second light source 20 without additional illumination, to project the second illumination 23 onto the driver 25*a*. As discussed herein, the second illumination 23 may be infrared illumination having a wavelength of approximately 940 nm. In some embodiments, when activating only the second light source 20, the controller 32 also may operate the imager 28 with the second portion 37 to enable image acquisition of a face and/or body of the driver 25*a*.

The controller 32 may process image data generated by the imager 28 while operating with the second portion 37 to monitor the driver 25*a*. The second portion 37 may be a wide field of view. The second horizontal field component 37*a* may be approximately 60° and the second vertical field component (not numbered) may be similar or different. As described herein, image data generated by the imager 28 may be shown on the display 33 and the driver 25*a* may adjust the position of the interior rearview mirror assembly 12 such that the image appearing on the display 33 is properly trained on the necessary biometric feature (e.g., face and/or body) required to monitor the driver 25*a*. Driver monitoring may include monitoring for sleepiness, inattentiveness, and other driver states. Additionally, the imager 28 may be configured to capture image data in the second portion 37 to provide for an occupancy detection (e.g., passenger occupancy) or detection of various objects in the cabin 24 of the vehicle.

As shown in FIGS. 6-9, the system 10 may project light into two or more separate or overlapping portions of the cabin 24 to illuminate the first and second portions 36, 37 of the field of view 35. In this way, images of the face and body of the driver 25*a*, the front passenger 25*b*, and/or the rear passengers may be captured. For example, both the first and second light sources 18, 20 may be operable to illuminate the driver 25*a*, as shown in FIG. 8. Alternatively, as shown in FIG. 9, the first light source 18 may be operable to illuminate the driver 25*a*, and the second light source 20 may be operable to illuminate the passenger compartments 24*a*, 24*b*, 24*c*. The first and second light sources 18, 20 may employ the first and second illumination ranges $\Theta_1$, $\Theta_2$, respectively, to illuminate particular areas of interest captured in the field of view 35. The first and second illumination ranges $\Theta_1$, $\Theta_2$ may each be part of a larger illumination range generated by the light sources 18, 20.

According to aspects of the present disclosure, the first illumination range $\Theta_1$ and the second illumination range $\Theta_2$ each may be formed via a collimating lens associated with each light source 18, 20 configured to generate a focused pattern of light. For example, the intensity of the light emitted from the light sources 18, 20 may vary over the distribution of a light beam pattern (e.g., higher central intensity, gradient distribution, etc.). In this way, a certain percentage of the light energy generated by the light sources 18, 20 may be relegated or controlled to project over a specific range of illumination and corresponding portions of the cabin 24 of the vehicle. By way of example, the distribution of light from the light sources 18, 20 may follow the pattern of a full width at half maximum (FWHM) distribution, where half of the light produced by the light source 18, 20 is within a specific range, and the other half may be distributed in a remaining range, typically with the total range approximating 120°.

With continued reference to FIGS. 6-9, the first illumination range $\Theta_1$ and the second illumination range $\Theta_2$ may encompass specific portions of the field of view 35 to allow the imager 28 to capture image data employed for recognition software. Similar to the corresponding field of view 35, the second illumination range $\Theta_2$ may be larger than the first illumination range $\Theta_1$. For example, the second light source 20 may employ a more powerful infrared emitter bank 27 or a light source with a lens or diffuser that emits light in a differed distribution pattern. The first and second illumination ranges $\Theta_1$, $\Theta_2$ may correspond to the particular functions each of the first and second light sources 18, 20 are employed to achieve. For example, the first light source 18 may be implemented to aid in recording facial recognition, and the second light source 20 may be implemented to aid in recording activity in the cabin 24 more generally, including monitoring passengers 25*a*, 25*b*.

Referring to FIG. 8, the second illumination range $\Theta_2$ may overlap the first illumination range $\Theta_1$. For example, the first and second light sources 18, 20 may have similar lens properties and orientations. In such cases, the controller 32 may alternatively activate the first and second light sources 18, 20 to toggle on and off sequentially in order to capture movement and/or direction of the eyes 26. In coordination with the illumination sequence, the imager 28 may capture a first image while the first light source 18 is energized and the second light source 20 is de-energized. A second image may be captured while the first light source 18 is de-energized and the second light source 20 is energized. The first and second images may then be compared to provide a focal direction of the eye 26. In this way, the eye glint and/or the pupil may be tracked for the occupant 25 if glasses cover the eye 26 of the occupant 25.

The imaging system 10 may employ particular lighting techniques that allow the controller 32 to identify the eye glint in the event that the occupant 25 dons wearable glasses. When a lens, such as a focal lens provided with wearable glasses, is disposed between one or both light sources 18, 20 and the eyes 26, a light glare spot may form on the wearable glasses. The light glare spot may obstruct the imager 28 from capturing a view of the pupil. However, some light may pass through the lens and reflect off of the eyes 26 to form the eye glint. Due to the presence of the light glare spot and the eye glint simultaneously, detection of the pupil and/or determination of which reflection (e.g., either the light glare spot or the eye glint) is the eye glint may be challenging. By alternating pulses of light from the light sources 18, 20, light reflected off of lenses of wearable glasses may produce different light glare spot locations. A comparison of the light glare spot locations may allow detection of the pupil and/or identification of the pupil, thereby indicating the focal direction of the eye 26.

Referring to FIGS. 8 and 9, the first light source 18 may be configured to project a first ray of light 40 onto a target surface corresponding to the first eye 26*a* of the occupant 25. The first light source 18 may also be configured to project a second ray of light 41 onto a target surface corresponding to the second eye 26*b* of the occupant 25. The first ray of light 40 may have a first light path 42 including a first projection component and a first reflection component (e.g., legs). The second ray of light 41 may have a second light path 48 including a second projection component and a second reflection component (e.g., legs). The first ray of light 40 may project from the first light source 18 along the first projection component and reflect off of the driver's left eye 26*a* toward the imager 28 along the first reflection component, and the second ray of light 41 may project from the first light source 18 along the second projection component and reflect off of the driver's right eye 26*b* toward the imager 28 along the second reflection component.

As a result of the spacing between the first light source 18 and the imager 28, the first ray of light 40 may form a first angle of incidence & between the first projection component and the first reflection component. The second ray of light 41 may form a second angle of incidence 82 between the second projection component and the second reflection component. The first and second projection/reflection components may be referred to herein as legs of each corresponding angle of incidence 81, 82. Each angle of incidence 81, 82 may be in the range of about 5° to 15°, and more particularly in the range of about 8° to 15° at a working distance of approximately 500 mm. The working distance may be in the range of about 300 mm to 700 mm. For example, an occupant 25 having a height of 1.9 meters may be reclined and/or situated at a distance (e.g., 650 mm) greater than a working distance (e.g., 400 mm) of an occupant 25 having a height of 1.5 meters. The second distance $D_2$ may be in the range of about 90 mm to 150 mm. The first distance $D_1$ and the second distance $D_2$ may be operable to define the angle of incidence in the range about 5° to 15°. It is generally contemplated that the first and second projection components may be within the first illumination range $\Theta_1$ and formed by the particular lens properties associated with the first light source 18.

As illustrated in FIG. 8, the second light source 20 may be configured to project a third ray of light 54 onto a target surface corresponding to the first eye 26*a* of the occupant 25. The second light source 20 may also be configured to project a fourth ray of light 56 onto a target surface corresponding to the second eye 26*b* of the occupant 25. The third ray of light 54 may have a third light path 58 including a third projection component and a third reflection component. The fourth ray of light 56 may have a fourth light path 64 including a fourth projection component and a fourth reflection component. The third ray of light 54 may project from the second light source 20 along the third projection component and reflect off of the driver's left eye 26*a* toward the imager 28 along the third reflection component. The fourth ray of light 56 may project from the second light source 20 along the fourth projection component and reflect off of the driver's right eye 26*b* toward the imager 28 along the fourth reflection component.

As previously discussed, the third light source 19 may be activated to provide additional light to the cabin 24 and allow for the first and/or second illuminations 22, 23 to dynamically adjust the illumination ranges $\Theta_1$, $\Theta_2$ based on the additional light. Additional auxiliary light sources 19 may be identified in the cabin 24 by processing an image of the cabin 24, and the controller 32 may operate the light sources 18, 20 to narrow the illumination ranges $\Theta_1$, $\Theta_2$ due to additional light projected from these auxiliary light sources 19. Stated differently, by providing auxiliary light sources 19 in the cabin 24, the first and second light sources 18, 20 may operate with narrower, more precise high-intensity ranges.

As a result of the spacing between the second light source 20 and the imager 28, the third ray of light 54 may form a third angle of incidence 83 between the third projection component and the third reflection component. The fourth ray of light 56 may form a fourth angle of incidence 84 between the fourth projection component and the fourth reflection component. The third and fourth projection/reflection components may be referred to herein as legs of each corresponding angle of incidence $\delta_3$, $\delta_4$. Each angle of incidence $\delta_3$, $\delta_4$ may be in the range of about 5° to 15°, and more particularly in the range of about 8° to 15° at a working distance of approximately 500 mm. In other words, the first distance $D_1$ and the second distance $D_2$ may be operable to define the angle of incidence $\delta_3$, $\delta_4$ in the range of about 5° to 15°. It is generally contemplated that the third and fourth projection components may be within the second illumination range $\Theta_2$ and formed by the particular lens properties associated with the second light source 20.

Referring to FIG. 9, the second light source 20 may have different lens properties and/or a different orientation than the first light source 18. In this way, the second illumination range $\Theta_2$ may encompass a broader area of the cabin 24 and/or a different area of the cabin 24 than the first light source 18 is configured to illuminate. For example, the second illumination range $\Theta_2$ may be configured to illuminate, at least, the front passenger compartment 24*b* and the rear passenger compartment 24*c* of the cabin 24. In this way, the second light source 20 may be operable to allow the imager 28 to capture image data related to passenger status, drowsiness of the occupants 25, etc., and the first light source 18 may be operable to allow the imager 28 to capture biometric data of the driver 25*a*. It is generally contemplated that, in addition to or in an alternative, the second light source 20 may be configured to output light with a greater intensity than the first light source 18.

Because the first light source 18 and the second light source 20 may each be spaced from the imager 28, the imaging system 10 may be operable to distribute individual thermal energy loads within the housing 16. Further, independent control of each light source 18, 20 may allow the imaging system 10 to prioritize the operation of the first and second light sources 18, 20. For example, if the controller 32 detects an overheat condition of the housing 16, or any other component of the imaging system 10, the controller 32 may be operable to deactivate the second light source 20 and only operate the first light source 18, or vice versa. The controller 32 may be pre-programmed to determine the priority of the first and second light sources 18, 20 in various scenarios, or may be programmed to update a prioritization memory based on repeated use (e.g., iterative training). According to some aspects of the present disclosure, the controller 32 may be operable to receive thermal data corresponding to thermal energy of the mirror assembly 12 and control the first and second light sources 18, 20 based on the thermal data. For example, the controller 32 may be operable to deactivate the second light source 20 based on the thermal data of the mirror assembly 12.

According to one aspect of the present disclosure, the imaging system 10 may be configured to selectively operate between a left-hand drive mode and a right-hand drive mode. In other words, the imaging system 10 may be considered to be "universal" in operation. For example, the first light source 18 and the second light source 20 may share identical lens properties (e.g., having the same orientation, same light output energy, same pattern, etc.), with the first light source 18 disposed on the first side 21*a* of the mirror assembly 12 and the second light source 20 disposed on the second side 21*b* of the mirror assembly 12, opposite the first side 21*a*. In this way, a mirror assembly 12 manufactured according to this aspect may be incorporated into vehicles with left-hand driving positions and vehicles having right-hand driving positions without change in function.

By way of example, because the imager 28 may be configured to capture images of the cabin 24, including the steering wheel 17, the controller 32 may be configured to determine the position of the steering wheel 17 and determine the configuration of the vehicle (e.g., left-hand or right-hand drive) based on the position of the steering wheel 17. This example is not intended to be limiting, as the controller 32 may additionally or alternatively be configured to determine the configuration of the vehicle based on identification of occupants 25 in the cabin 24, or other vehicle features. Once the configuration of the vehicle is determined, control of the first and second light sources 18, 20 may be optimized. For example, the controller 32 may be configured to prioritize employment of the light source associated with driver 25*a* recognition over employment of the light source associated with the front or rear passenger compartment 24*b*, 24*c* of the cabin 24 in the event of the mirror assembly 12 meeting a thermal threshold. Continuing with this example, the controller 32 may be configured to de-activate either the first light source 18 or the second light source 20 depending on the configuration of the vehicle.

According to one aspect of the invention, a rearview assembly for a vehicle is provided including a reflective element; an infrared illumination source disposed behind the reflective element and configured to emit infrared light through the reflective element to illuminate a field of view with infrared light, the field of view including at least part of a vehicle cabin; and an optical element disposed behind the reflective element and configured to direct infrared light from the infrared illumination source towards the field of view. The optical element including: a molded portion comprised of a visibly opaque material that is substantially transparent to the infrared light, the molded portion having a front surface and a rear surface; and a reflector disposed on the rear surface of the molded portion and configured to substantially reflect infrared light emitted from the illumination source that transmits through the molded portion towards the field of view.

According to various aspects, the disclosure may implement one or more of the following features or configurations in various combinations:

- wherein the molded portion may have a transmittance of at least 80% for infrared light and a transmittance of 5% or less for visible light;
- wherein the molded portion has a recessed cup formed in the front surface with an opening through to the rear surface where the infrared illumination source is positioned;
- wherein the recessed cup is truncated with a flat surface above the opening to block infrared light from being directed towards a headliner of the vehicle;
- wherein the infrared illumination source includes a plurality of LEDs;
- wherein the molded portion has a plurality of recessed cups formed in the front surface each with an opening through to the rear surface where a corresponding one of the plurality of LEDs is positioned;
- wherein each of the plurality of recessed cups is truncated with a flat surface above the opening to block infrared light from being directed towards a headliner of the vehicle;
- wherein the front and rear surfaces of the molded portion have different shapes selected to provide uniform illumination throughout the field of view while taking into account angles of refraction and reflection caused by the molded portion; and
- further including at least one imager configured to acquire an image within a field of view of the imager, the field of view including at least part of a vehicle cabin, wherein the field of view of the imager corresponds to the field of view of illumination by the infrared illumination source.

According to another aspect of the invention, an imaging system for a vehicle is provided including a reflective element configured to provide a driver of the vehicle with a view rearward relative to the vehicle, the reflective element substantially transparent in an infrared region of the electromagnetic spectrum; at least one imager in connection with the rearview assembly and configured to acquire an image within a field of view of the imager, the field of view including at least part of a vehicle cabin; an infrared illumination source disposed behind the reflective element and configured to emit infrared light through the reflective element to illuminate at least a portion of the field of view of the imager with infrared light; and an optical element disposed behind the reflective element and configured to direct infrared light from the infrared illumination source towards the field of view. The optical element including: a molded portion comprised of a visibly opaque material that is substantially transparent to the infrared light, the molded portion having a front surface and a rear surface; and a reflector disposed on the second surface of the molded portion and configured to substantially reflect infrared light emitted from the illumination source that passes through the molded portion towards the field of view.

According to various aspects, the disclosure may implement one or more of the following features or configurations in various combinations:

- wherein the molded portion may have a transmittance of at least 80% for infrared light and a transmittance of 5% or less for visible light;
- wherein the molded portion has a recessed cup formed in the front surface with an opening through to the rear surface where the infrared illumination source is positioned;
- wherein the recessed cup is truncated with a flat surface above the opening to block infrared light from being directed towards a headliner of the vehicle;
- wherein the infrared illumination source includes a plurality of LEDs;
- wherein the molded portion has a plurality of recessed cups formed in the front surface each with an opening through to the rear surface where a corresponding one of the plurality of LEDs is positioned;
- wherein each of the plurality of recessed cups is truncated with a flat surface above the opening to block infrared light from being directed towards a headliner of the vehicle; and wherein the front and rear surfaces of the molded portion have different shapes selected to provide uniform illumination throughout the field of view while taking into account angles of refraction and reflection caused by the molded portion.

According to another aspect of the invention, a rearview assembly is provided for a vehicle, the rearview assembly including: a reflective element configured to provide a driver of the vehicle with a view rearward relative to the vehicle, the reflective element substantially transparent in an infrared region of the electromagnetic spectrum; at least one imager in connection with the rearview assembly and configured to acquire an image within a field of view of the imager, the field of view including at least part of a vehicle cabin; a plurality of infrared LEDs disposed behind the reflective element and configured to emit infrared light through the reflective element to illuminate at least a portion of the field of view of the imager with infrared light; and an optical element disposed behind the reflective element and configured to direct infrared light from the infrared LEDs towards the field of view. The optical element including: a molded portion comprised of a visibly opaque material that is substantially transparent to the infrared light, the molded portion having a front surface and a rear surface, and a plurality of recessed cups formed in the front surface each with an opening through to the rear surface where a corresponding one of the plurality of LEDs is positioned; and a reflector disposed on the rear surface of the molded portion and configured to substantially reflect infrared light emitted from the illumination source that passes through the molded portion, the reflector reflects the infrared light towards the field of view of the imager.

According to various aspects, the disclosure may implement one or more of the following features or configurations in various combinations:

wherein the molded portion may have a transmittance of at least 80% for infrared light and a transmittance of 5% or less for visible light; and wherein each of the plurality of recessed cups is truncated with a flat surface above the opening to block infrared light from being directed towards a headliner of the vehicle.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A rearview assembly for a vehicle, the rearview assembly comprising:

a reflective element configured to provide a driver of the vehicle with a view rearward relative to the vehicle, the reflective element substantially transparent in an infrared region of the electromagnetic spectrum;

an infrared illumination source disposed behind the reflective element and configured to emit infrared light through the reflective element to illuminate a field of view with infrared light, the field of view including at least part of a vehicle cabin; and an optical element disposed behind the reflective element and configured to direct infrared light from the infrared illumination source towards the field of view, the optical element comprising:

a molded portion comprised of a visibly opaque material that is substantially transparent to the infrared light, the molded portion having a front surface and a rear surface; and a reflector disposed on the rear surface of the molded portion and configured to substantially reflect infrared light emitted from the illumination source that passes through the molded portion towards the field of view, wherein the molded portion has a recessed cup formed in the front surface with an opening through to the rear surface where the infrared illumination source is positioned.

2. The rearview assembly of claim 1, wherein the molded portion has a transmittance of at least 80% for infrared light and a transmittance of 5% or less for visible light.

3. The rearview assembly of claim 1, wherein the recessed cup is truncated with a flat surface above the opening to block infrared light from being directed towards a headliner of the vehicle.

4. The rearview assembly of claim 1, wherein the infrared illumination source includes a plurality of LEDs.

5. The rearview assembly of claim 4, wherein the molded portion has a plurality of recessed cups formed in the front surface each with an opening through to the rear surface where a corresponding one of the plurality of LEDs is positioned.

6. The rearview assembly of claim 5, wherein each of the plurality of recessed cups is truncated with a flat surface above the opening to block infrared light from being directed towards a headliner of the vehicle.

7. The rearview assembly of claim 1, wherein the front and rear surfaces of the molded portion have different shapes selected to provide uniform illumination throughout the field of view while taking account angles of refraction and reflection caused by the molded portion.

8. The rearview assembly of claim 1 and further comprising at least one imager configured to acquire an image within a field of view of the imager, the field of view including at least part of a vehicle cabin, wherein the field of view of the imager corresponds to the field of view of illumination by the infrared illumination source.

9. An imaging system for a vehicle, comprising:

a reflective element configured to provide a driver of the vehicle with a view rearward relative to the vehicle, the reflective element substantially transparent in an infrared region of the electromagnetic spectrum;

at least one imager in connection with the rearview assembly and configured to acquire an image within a field of view of the imager, the field of view including at least part of a vehicle cabin;

an infrared illumination source disposed behind the reflective element and configured to emit infrared light through the reflective element to illuminate at least a portion of the field of view of the imager with infrared light; and an optical element disposed behind the reflective element and configured to direct infrared light from the infrared illumination source towards the field of view, the optical element comprising:

a molded portion comprised of a visibly opaque material that is substantially transparent to the infrared light, the molded portion having a front surface and a rear surface; and a reflector disposed on the rear surface of the molded portion and configured to substantially reflect infrared light emitted from the illumination source that passes through the molded portion, the reflector reflects the infrared light towards the field of view of the imager, wherein the molded portion has a recessed cup formed in the front surface with an opening through to the rear surface where the infrared illumination source is positioned.

10. The imaging system of claim 9, wherein the molded portion has a transmittance of at least 80% for infrared light and a transmittance of 5% or less for visible light.

11. The imaging system of claim 9, wherein the recessed cup is truncated with a flat surface above the opening to block infrared light from being directed towards a headliner of the vehicle.

12. The imaging system of claim 9, wherein the infrared illumination source includes a plurality of LEDs.

13. The imaging system of claim 12, wherein the molded portion has a plurality of recessed cups formed in the front surface each with an opening through to the rear surface where a corresponding one of the plurality of LEDs is positioned.

14. The imaging system of claim 13, wherein each of the plurality of recessed cups is truncated with a flat surface above the opening to block infrared light from being directed towards a headliner of the vehicle.

15. The imaging system of claim 9, wherein the front and rear surfaces of the molded portion have different shapes selected to provide uniform illumination throughout the field of view while taking into account angles of refraction and reflection caused by the molded portion.

16. A rearview assembly for a vehicle, the rearview assembly comprising:

a reflective element configured to provide a driver of the vehicle with a view rearward relative to the vehicle, the reflective element substantially transparent in an infrared region of the electromagnetic spectrum;

at least one imager in connection with the rearview assembly and configured to acquire an image within a field of view of the imager, the field of view including at least part of a vehicle cabin;

a plurality of infrared LEDs disposed behind the reflective element and configured to emit infrared light through the reflective element to illuminate at least a portion of the field of view of the imager with infrared light; and an optical element disposed behind the reflective element and configured to direct infrared light from the infrared LEDs towards the field of view, the optical element comprising:

a molded portion comprised of a visibly opaque material that is substantially transparent to the infrared light, the molded portion having a front surface and a rear surface, and a plurality of recessed cups formed in the front surface each with an opening through to the rear surface where a corresponding one of the plurality of LEDs is positioned; and a reflector disposed on the rear surface of the molded portion and configured to substantially reflect infrared light emitted from the illumination source that passes through the molded portion, the reflector reflects the infrared light towards the field of view of the imager.

17. The rearview assembly of claim 16, wherein the molded portion has a transmittance of at least 80% for infrared light and a transmittance of 5% or less for visible light.

18. The rearview assembly of claim 16, wherein each of the plurality of recessed cups is truncated with a flat surface above the opening to block infrared light from being directed towards a headliner of the vehicle.

* * * * *